United States Patent [19]
George

[11] Patent Number: 4,865,266
[45] Date of Patent: Sep. 12, 1989

[54] HOT AIR BALLOON AND METHODS AND DEVICES FOR AUGMENTING BUOYANCY, RATE OF LIFT, SAFETY, ENVELOPE LIFE AND ECONOMY

[76] Inventor: Harry S. George, 1232 N. Fed. Hwy., Lake Worth, Fla. 33460

[21] Appl. No.: 120,034

[22] Filed: Aug. 24, 1987

Related U.S. Application Data

[63] Continuation-in-part of Ser. No. 764,764, Aug. 12, 1985, abandoned.

[51] Int. Cl.$^4$ ............................ B64B 1/40; B64B 1/62
[52] U.S. Cl. ........................................... 244/31; 244/97
[58] Field of Search ....................... 244/30, 31, 33, 24, 244/97, 98

[56] References Cited

U.S. PATENT DOCUMENTS

| | | | |
|---|---|---|---|
| 3,565,368 | 2/1971 | Byron | 244/31 |
| 4,084,771 | 4/1978 | Creuzet | 244/31 |

Primary Examiner—Joseph F. Peters, Jr.
Assistant Examiner—Rodney Corl

[57] ABSTRACT

The invention improve hot air balloons of the type using heavy duty propane burners producing large unconfined flames by manually controlled intermittent short combustion periods,—the type used for the sustained flight and transport of one or more passengers. The improvements comprise increased lift and rate of lift, fuel economy, safety of components and passengers, envelope life, and elimination of scorching and near-scorching of the envelope and skirt, reduced cumulative deterioration of the envelope; these improvements are accomplished by the elimination of the hiterto unrecognized large loss of radiant energy from the flame which has passed through the transparent gas and translucent portions of the envelope (thin, light colored) and being lost without having heated the interior gases,—by means of opaque shields of metal and/or fabric suspended between the flame and the envelope to intercept the radiant energy, convert it to heat energy and transfer it to the contiguous gases.

Solar energy is utilized in the same maner by increasing the translucency of the ceiling and intercepting the solar energy that passes through it by an opaque diaphragm suspended beneath the ceiling. This subceiling has two other simultaneous functions: it intercepts the radiant energy from the flame and converts it to heat and it collects a pocket of hot gas to agument buoyancy. Annular diaphragms suspended at successively lower levels collect annular pockets of hot gas to increase the average gas temperature and augment lift.

13 Claims, 2 Drawing Sheets

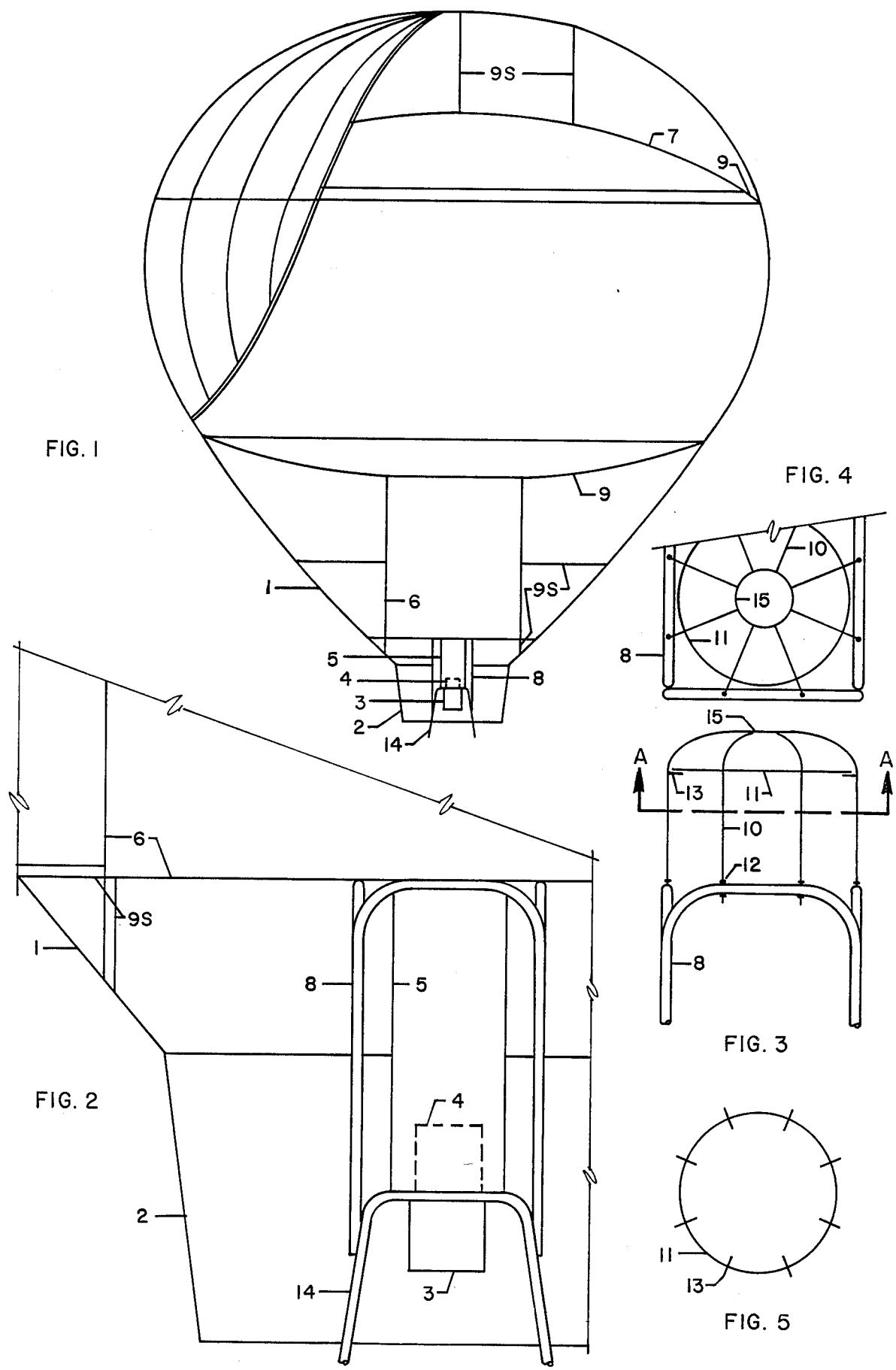

HOT AIR BALLOON AND METHODS AND DEVICES FOR AUGMENTING BUOYANCY, RATE OF LIFT, SAFETY, ENVELOPE LIFE AND ECONOMY

This is a continuation-in-part of Ser. No. 764,764 filed Aug. 12, 1985, now abandoned.

BACKGROUND OF THE INVENTION

These inventions apply to the only type of hot air ballon considered capable and feasible for the sustained manned flight and transport of one or more passengers. It was developed in the 1960's and is used principally for sport and recreation. The most popular size which will be described and used illustratively herein, is about fifty feet in diameter and provides a lift capacity of about 1500 pounds, far in excess of the volume of buoyant hot gas and lift required for normal use, i.e., short flights in the early morning or late afternoon.

Before 1960 the combustion required to heat and reduce the density of the balloon gas to render it buoyant was confined in an enclosure or furnace, an efficient system but limiting the rate of combustion to avoid destruction of the furnace and the balloon. It was not responsive to the need for rapid change in altitude for maneuverability and was too hazardous.

The present system employs one or more heavy duty propane burners each producing a large unconfined flame, operated intermittently by short blasts of combustion. Though inefficient and inherently handicapped it proved very practicable.

The buoyancy or amount of lift depends on the volume and average temperature of the gas contained in the balloon envelope which universally is made of synthetic fabric coated with a synthetic sealer having a maximum allowable operating temperature in the range 250°–300° F.

Because hot gas rises and accumulates under the ceiling of the balloon, temperature sensors are strategically located to indicate the temperature to the operator and enable him to manually control the temperature within safe limits, an operation requiring skill, experience and careful attention. The obvious potential hazards of this present system are eliminated by the invention, as explained hereinafter.

It is briefly noted here, and fully explained below, that one component of the invention comprises a diaphragm of envelope or similar material suspended horizontally and slackly beneath the balloon ceiling and above the equator, by tension members connecting a multiplicity of points on its periphery to points on the envelope. Sufficient distance is provided, between the diaphragm and the envelope to allow the passage of gas. This component constitutes a subceiling having three simultaneous automatic functions: 1, to intercept radiant energy from the flame, convert it to heat and transfer it to the contiguous gas; and, 2, to intercept the radiant energy from the sun that enters the balloon through translucent portions of the ceiling, convert it to heat and transfer it to the contiguous gas: 3, to provide a subceiling to accumulate a pocket of hot gas to augment buoyancy or lift. These three functions have the common purpose and ability to increase the average temperature of the gas to provide the buoyancy or lifting capacity of the balloon. The specification deals with these functions in order.

These inventions improve "hot air" balloons and the heating of the gases within them, the heat being supplied by one or more flames of burning propane. In one popular model, the incandescent portion of the products of combustion, the flame, is in the form of a vertical column about twelve-fifteen inches in diameter extending about six feet high, measured from the burner orifice or orifices; this size of flame is typical of modern hot air balloons.

MARKS Mech. Eng. Handbook, 8th Ed. 4–78 states: "Radiation from carbon dioxide and water vapor (combustion products) occurs in spectral bands in the infrared. In magnitude it overshadows convection at furnace temperatures." It is also known that the amount of radiant energy emitted by a substance increases as the fourth power of the temperature. Therefore it is evident that the amount of radiant energy emitted by burning propane having a flame temperature of 3500 deg. F. is greater than the convected heat energy.

The rate of combustion of a balloon burner is enormous. What makes its use possible is the system of very short combustion periods which not only reduces the rate and amount of energy transmitted but enables self-cooling of the heated object between combustion periods.

Gases are practically transparent to radiant energy and therefore are not heated by it. Radiant energy travels in straight lines in all directions from every point on the flame and rising column of hot combustion products until it is intercepted by some opaque object within the balloon or until it is intercepted by the balloon envelope when it is converted to heat energy. Some of the heat is transferred to the interior gas by conduction and convection, and some is lost to the outside atmosphere. I have discovered that at least one modern balloon envelope material is translucent radiant energy, a substantial amount from the flame passing outward and that from the sun, solar energy, passing inward. These inventions include the utilization of the radiation from both sources.

With respect to the radiant energy converted to heat energy by and within the envelope material, the amount lost to the outside and the amount transferred to the gases within the balloon are indeterminate, but it is evident that the former greatly exceeds the latter because the temperature gradiant (under normal conditions at altitude) is much steeper downward to the outside atmosphere than to the inside. From the above considerations I have concluded that the former method of heating the gases within the hot air balloon is inherently handicapped by the fact that most of the energy released by the combustion process passes through the gases without heating them and, when finally converted to heat energy by and within the envelope material, most of the heat is lost to the outside atmosphere. My inventions utilize practically all of the energy formerly lost.

Recapitulation: former losses of energy from within the balloon through the envelope to the outside atmosphere have been: 1,—some of the radiant energy from the flame passed through the envelope, if it was translucent; 2,—most of the radiant energy converted to heat by and within the envelope material was lost to the outside atmosphere; and, 3,—heat from the hot interior gas, conveyed to the inside surface of the envelope, passed through it by conduction, and then heated the boundary layer of the outside atmosphere by conduction and was conveyed away and lost. My invention prevents the loses described in 1 and 2. Under certain conditions, as will be seen, the loss as in 3 can be reversed by my invention, by augmenting the amount of solar radiation entering the balloon and converting it to heat.

SUMMARY OF THE INVENTION

The inventions include a novel method and novel devices for intercepting the radiant energy from the flame and the sun, as it passes through the space within the balloon, converting it to heat energy, and transferring it to the contiguous gases, thus saving the energy formerly lost, and enabling a large increase in flight time for a given amount of fuel and, conversely, enabling a large saving in fuel for a given flight time. Other advantages include a large reduction in the number, (and weight) of fuel tanks and amount of fuel required to be carried in the balloon for a given flight time.

Other correlative advantages of far greater importance include, as will be seen, increased buoyancy, rate of lift, safety and the prolongation of the life of the envelope and the skirt, and the elimination of scorching.

The invention may employ a variety of constructions and materials. Thus, titanium sheet metal and/or stainless steel sheet metal or plain steel are necessary for radiant energy interceptors placed in close proximity to the incandescent flame, whereas aluminum and magnesium are preferred for their lightness when the interceptor shield is placed at a suitable intermediate distance from the flame. Balloon envelope material or similar fabric if opaque may be used at locations close to the envelope, and is preferred for reasons to be explained. Interceptors or shields should be constructed and positioned to permit the flow of air to the burner and the mixing of the products of combustion with the contiguous gases.

I have found that the effectiveness of opaque shields for the purposes of the invention is not affected by the material or the distance from the flame. I have also found that to use more than one layer of shield does not improve or affect its ability as an interceptor of radiant energy. An exception is the case where the shield may become heated to such a high temperature and emit so much radiant energy as to make it worthwhile to introduce a second shield. Another exception is the case where it may be desired to use more than one layer of partly opaque material to increase opacity.

A principal factor influencing the design of a shield or a system of shields is the matter of the ease of handling and portability after a flight when the balloon and its equipment must be packed and transported elsewhere. Weight is another important design factor. The simple, light and portable systems described below effect a very large saving of fuel.

BRIEF DESCRIPTION OF THE DRAWINGS

A specific popular model of a hot air balloon will be discussed, together with its former operation and the functions of the invention. The Figures may be helpful in this foundation discussion, which is included as the author does not know of any suitable text on balloons and their operation.

FIG. 1 is a front elevation view of the invention.
FIG. 2 is an enlargement of part of FIG. 1.
FIG. 3 is a front elevation view of the portion of the guard-frame.
FIG. 4 is a plan view of the assembly of FIG. 3.
FIG. 5 is a bottom view of section A—A of FIG. 3.

DETAILED DESCRIPTION OF THE INVENTION

Figure 6:
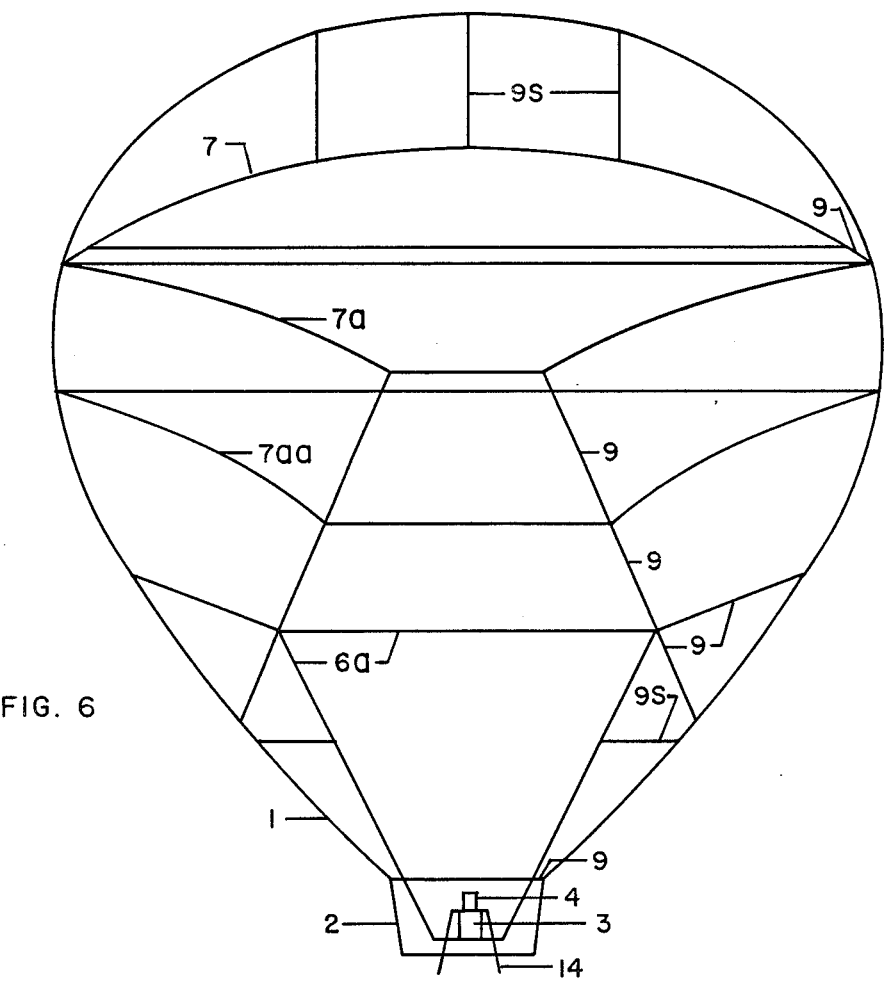
FIG. 6 is an elevation view of another embodiment of the invention.

FIG. 1 is an elevation of a "hot air" balloon showing envelope 1 and skirt 2. Much of the front right side of the envelope and the front of the skirt are removed to show burner housing 3, preheating coil 4, fabric vertical interceptor 6, and fabric horizontal interceptor 7; also vertical interceptor support (and tubular guard-frame) 8, and attachment tapes 9. Guard-frame 8 is mounted on tubular frame 14 which is suspended from the balloon envelope to hold the basket (not shown). Guard-frame 8 supports the burner housing 3 on which is mounted preheating coil 4. Omitted for clarity are suspension members for attaching frame 14 to the balloon. Part 5 is a metallic vertical interceptor supported and guarded by guard-frame 8. Louvered construction of 5 is omitted for clarity.

FIG. 2 is an enlargement of all parts of FIG. 1, except interceptor 7. For clarity the diameter of the tubular frames and the width of tapes 9 are further enlarged. Vertical interceptor 5 is a rectangular (or cylindrical) flue of sheet steel or titanium, having louvers (not shown) in its lower portion surrounding the preheating coils. If the flue is rectangular the louvers are horizontal; if cylindrical they are vertical. The louvers may extend, at intervals, throughout the height of the interceptor.

FIG. 3 is a front elevation of the top portion of guard-frame 8 to which is detachably added wire guard-frame 10 for supporting metallic horizontal interceptor 11. Frame 10 is detachably fixed to guard-frame 8 by passing the threaded ends of its vertical wire members through holes in guard-frame 8 and fastening them with nuts 12. Shelf pins 13 are welded to frame 10 to support interceptor 11 to which they are welded. The top ends of wires 10 are welded to the underside of cap 15.

FIG. 6 is an elevation of a hot air balloon showing envelope 1 having the front removed to show horizontal diaphragm 7, and annular diaphragms 7a and 7aa. Vertical interceptor 6a is also known, all with accessory tension members.

The most popular model of the "hot-air" balloon (1, FIG. 1) of one manufacturer, is fifty-five feet in diameter, having a ten foot diameter opening at the bottom, termed the throat or mouth, from which a circumferential skirt of envelope or similar material hangs downward about five feet. A basket or operating platform is suspended below the skirt, 2, for containing the operator and passengers, fuel tanks and other equipment. A framework 14, attached to the basket and extending above it, supports the burner and fuel lines, valves, etc. The burner itself is located about centrally within the skirt enclosure.

Burners may produce a single flame, but the balloon described, illustratively, employs a burner having a row of small flames from orifices in a horizontal S shaped tube positioned centrally within a box-like housing 3, having large lightening holes in its sides. These flames merge and rise in a single column within a coil of tubing, positioned above the burner housing and supported by it, through which liquid propane is fed and preheated. Another, larger, balloon has a pair of such burners side by side in separate boxes and with separate preheating coils, thus producing twin columns of hot products of combustion.

Each such burner when in flight is operated intermittently by short blasts of combustion, operating at the full capacity of the burner which amounts to a rate of 12,000,000, B.T.U. per hour; with liquid propane producing 91,500 B.T.U. per gallon it will be seen that, if operated continuously, each burner would consume 130 gallons per hour. Actually, a typical flight consumes about 15 gallons per hour.

As the column of gas rises, contiguous gas mixes with it; the lower, incandescent, zone, or flame, as mentioned above, emits far more energy by radiation than it transfers to the contiguous gas. This disparity lessens as the products of combustion are cooled by mixing with the surrounding gas. Therefore, as a matter of practicality, the primary object of the invention is to intercept the radiant energy emanating from the lower incandescent flame portion of the rising column of the products of combustion, extending from the burner orifices upwards about six feet, in the illustrative example.

I may employ a shield, or combination of shields, positioned so close to the burner housing and the column of flame as to exclude the use of aluminum and to require the use of iron, stainless steel, or titanium (for its lightness), and I may mount such a close fitting shield on the burner housing or the coil supports attached thereto. For reasons described below a more universal system of interceptors and their supports is preferred, applicable to the single flame, unhoused burner as well as to the housed burner.

Lighter and less refractory materials may be employed as interceptors positioned at a suitable distance from the flame to avoid damage by the heat. Increasing the distance requires an increase in the interceptor area, which is advantageous as it exposes a larger surface for the transference of the heat generated by the interceptor to the contiguous gases passing over it.

The optimum combination of the various factors affecting the design of the interceptors and their supports is not a matter that is susceptible to mathematical analysis but one that can be approached only by extensive tests and experience. A major impediment to comparative testing is the difficulty, if not impossibility, of controlling or duplicating the environment in which tests are conducted in actual flight.

My tests on small scale simulated balloons, using various envelope materials, show that the invention approximately doubles the rate of heating the gas and the highest temperature reached, for a given heat source, and rate of energy supplied, for all envelope materials tested. I believe these tests to be unique and have found no evidence of any conscious or deliberate attempt to accomplish the objects of my invention, namely,—to intercept radiant energy within the walls of an enclosure by interposing a shield of opaque material between the source of the radiant energy and the walls, said shield having the sole or principal purpose of converting the radiant energy to heat energy and transferring it to the contiguous gases.

My small scale tests were made under controlled conditions, difficult if not impossible to establish on full scale balloons in flight. They were conducted inside, in the shade, with no wind, constant outside temperature and constant duplicable heat source. I discovered and proved that one modern balloon envelope material is translucent to radiant energy to a substantial degree. The tests included opaque, translucent and transparent envelope material. Plotting curves showing the rate of temperature rise and the highest temperature attained for a given heat source, with and without the use of my invention, it was found that the curves for translucent and transparent envelope material were indistinguishable and the the curves for opaque material were somewhat higher than for the other two. In all cases the invention doubled the rate of temperature rise and the highest temperature attained for a given rate of heat input. The thermometer was shielded against radiant energy and the temperature was measured close to the top of the test balloon.

There are several feasible supporting systems. One, already mentioned, is to locate the vertical shields close to the flame and support them on the burner housing or the coil supports attached to the burner housing. Another is to support them from a frame 8, FIGS. 1 and 2, attached to and extending upwards from the frame 14 that supports the basket, (see FIG. 2); a third system comprises suitable attachments to the balloon envelope.

Horizontal shields can be supported at a suitable location above the flame by any of the above three supporting systems, as will be described.

Vertical shields can also be supported at an intermediate lateral distance by balloon envelope attachments as well by the basket frame extension.

All of the above locations and support systems are amenable to the design and construction of practical systems for practicing the invention within acceptable weight limits.

The first two support systems are rigid while the third, described below, is a flexible suspension system, attached to the envelope. It has the advantage of simplicity, portability, adaptability and as being proof against damage during landing. It is composed of two similar independent systems, one to support the horizontal interceptor shield, above the flame, and the other to support the vertical shields, to intercept lateral and downward rays of radiant energy.

Another novel and advantageous use for the special opaque fabric mentioned above is as a horizontal interceptor 7, FIG. 1, located at such a height above the flame as to avoid damage from the heat. For reasons to be described later, I prefer to locate it above the middle or equator of the balloon, attaching it by tapes 9 to the envelope, and to make it diameter sufficiently less than the balloon diameter when inflated as to permit the flow of the gases past it. It is preferably a continuous one-piece diaphragm, or it can comprise several unconnected sectors to permit the flow of gases through the diaphragm. The fabric previously described has a weight of about 0.01–0.015 pounds per square foot, hence the weight of a diaphragm having a diameter of about fifty feet would amount to about twenty to thirty pounds. Two other automatic functions of component 7 will be described.

Aside from the special reason for the diameter of the horizontal interceptor 7 to be as large as indicated, it can be only large enough as to cover the vertical interceptor, i.e., about twelve feet in diameter; and it should be located at a height such as to ensure against damage by overheating from the rising hot gases. However, as will be seen, the special rasons, now to be described, favor the larger diaphragm located above the midpoint of the balloon.

Having discovered that at least one modern envelope material is translucent to radiant energy I employ a large diaphragm described above, to intercept the solar radiation penetrating the envelope, convert it to heat energy and transfer it to the contiguous gases in the balloon.

Formerly, most of the solar radiation penetrating the envelope has been lost just as the radiant energy from the flame has been lost, as already described. The amount of solar radiation penetrating translucent portions of the envelope is indeterminate but according to my small scale tests it is clearly substantial. This amount is potentially capable of being greatly increased up to an amount of the same order of magnitude as that supplied by the burner in a typical flight. I produce a substantial increase of solar radiation by increasing the translucency of the envelope by reducing or omitting dye, stain and pigment in the nylon, neoprene and any other component of the envelope.

The described advantage of my improvement of balloon envelope material due to reducing and eliminating color is chiefly applicable to the area of the envelope above the equator of the balloon because Solar and Sky radiation falls almost entirely on that area. If that were not the case the advantage of thus heating the interior gas would probably not be utilized because of the universal employment of colorful fabric for decorative and commercial purposes. However, because my improvement is restricted to the upper polar region, the elimination of color is not a deterrent as that region is hardly noticed from the ground.

Well known data on solar radiation indicates an amount of 7.12 B.T.U. per minute per square foot normal to the sun's rays above the earth's atmosphere, and in dry clear climate the loss is small. Calculating the amount of solar radiation falling on a 55 foot diameter balloon: $3.14 \times (27.5)^2 \times 7.12 \times 60 = 1,014,440$ B.T.U. per hour; this is almost as much as that released by a typical flight consumption rate of 15 gallons of propane per hour, or $91,500 \times 15 = 1,372,500$ B.T.U. per hour using the single burner previously referred to.

Kents Handbook of Mech. Eng. 12th Ed. page 3-26 gives the amount of Solar plus Sky radiation on a clear day in summer for the Eastern U.S. as 235 B.T.U. per hour per square foot; for a 55 foot diameter balloon the amount is 558,000 B.T.U. per hour.

An important advantage of increasing the translucency of the envelope over its upper polar region is that it enables and increases solar radiation penetration of the envelope so that it can be intercepted within the balloon and converted to heat; another advantage lies in the fact that translucency retards or prevents temperature rise in the fabric thus prolonging its life. Except for the lowest zone, the skirt, which has heretofore been subject to scorching, the upper polar region has hitherto been the hottest because of the accumulation of the hot gases in that region and the temperature rise of the fabric due to the interception of solar radiation and its conversion to heat by and within the fabric.

If the balloon is to be used under conditions unfavorable to the utilization of solar radiation, the diameter of the horizontal diaphragm can be reduced and it can be suitably located so that it functions only to intercept the upward radiation from the flame, as in FIG. 3, 4 and 5 in which part 11 illustrates the horizontal interceptor, located two to three feet above the top of the flame. Its diameter can be two to three feet. It should be made of about 0.02 inch thick sheet steel (or of titanium for lightness). Because of its proximity to the flame it is supported by a "bird cage" framework 10, of steel wire, of about 6 to 8 gage. The smooth rounded upper part of frame 10, together with the strength of the steel frame, is designed to withstand not only elevated temperatures but also the moderate stress encountered in landing, there being no sharp corners or edges, a feature also provided by the smooth rounded construction of the tubular guard-frame 8, FIG. 1, 2 and 3.

Guard-frame 8 can be constructed of one inch diameter aluminum tubing, wall thickness of 0.047 inch. It is constructed and attached to the basket suspension frame 14 by well known standard forming and bolting practices.

An important advantage of the invention is prolonging the life of the envelope and the skirt, which heretofore has been subject to scorching due to inflation accidents and irregularities in rates of fuel consumption. Because of scorching it has been the practice of at least one manufacturer to supply as many as five spare skirts with each balloon. My invention prolongs envelope life, the skirt life and the life of fabric used for shielding, and prevents scorching by interposing a metallic shield or shields between the flame and the skirt or other fabric.

Vertical interceptors 5 and 6, have an automatic additional useful function besides intercepting radiant energy: the physical protection of the envelope, and skirt, from accidental contact and near-contact with the flame during the inflation operation. While scorching is visually detectable, near-scorching is not. Moreover, its deleterious effects are cumulative, analogous to skin cancer, and have been undetected and undetectable. Such cumulative deterioration is also caused by prolonged and repeated irregularities in the manual control of the intermittent combustion system.

Vertical interceptor 5 eliminates accidental contact and near-contact between the flame and the envelope and vertical interceptor 6, and it, together with 6 eliminates the cumulative deterioration of the envelope due to irregularities in the manual control of the combustion process, by preventing radiant energy from the flame from reaching the envelope.

Because there is no known way, other than visual detection of scorching, of determining when time and temperature have dangerously deteriorated envelope material, it would seem advisable that these inventions should be made mandatory for reasons of safety of the balloon and passengers.

The inflation process requires one or more additional sets of tension members termed spacers, numbered 9s, having the function of mantaining fabric interceptors 6 and 7 at a maximum fixed distance from the adjacent envelope during the early stages of inflation to prevent said interceptors from sagging down or inward toward the central zone of rising hot gas. For vertical interceptor 6, spacers may comprise one or more circumferential rows attached at one or more levels. Interceptor 7 requires at least one spacer located centrally.

Tension members may be nylon cords or their equivalent or, optionally, sash chain for increased heat resistance and increased life.

It will be seen that none of the interceptors illustrated intercepts all of the downward slanting radiation from the flame and from the parts heated by the flame, i.e., no lower horizontal interceptor is illustrated. Obviously such interception can be added, but since the advantage would be minimal it is considered preferable to omit such interceptors in the interest of accessibility to the burner and accessories.

A third function of horizontal diaphragm 7, as a sub-ceiling to accumulate a pocket of hot gas, has been briefly described. The use of this principle for augmenting buoyancy is expanded by using one or more additional diaphragms suspended at successively lower levels; these are designated 7a and 7aa, and are in the form of annular diaphragms attached at their perimeters, by substantially continuous seams, to the envelope and having a multiplicity of tension members, preferably light sash chain, for strength and heat resistance, attached to their inner edges and extending down and attached to the balloon at a lower level or to a structure suspended from the balloon, said diaphragms providing annular pockets of hot gas said tension members maintaining the depicted pocket configurations of the diaphragms.

As shown in FIG. 6, components 7a and 7aa, form annular pockets of hot gas, at successively lower levels to increase the average temperature of the interior gas and thus augment the buoyancy (increased lift) or optionally, for the same lift, to operate at lower temperature to prolong the life of the envelope. The lower diaphragms need not be opaque. The annular diaphragms may be constituted of thin weak material which should be heat resistant and non-toxic at the operating temperature. The material is not stressed significantly as there is not enough difference in temperature between the pocket gas and the surrounding gas to exert significant buoyant force. If made of strong envelope fabric the total weight of 7a and 7aa is about 45 lbs.

The increase in lift from the three diaphragms is about 350 pounds, a net gain of 350−45=305 pounds i.e., two or three extra passengers. The dimensions and locations are shown to scale in reference to the 55 foot diameter balloon illustrated.

While each of the various components comprising the inventions may make it preferable for some specific purpose, yet, overall, to maximise buoyancy, or its optional alternative, to lower the operating temperature to maximise envelope life and safety, the preferred embodiment of the inventions comprises a combination of fabric and metallic components: vertical interceptor 6a, horizontal diaphragms 7, 7a and 7aa and horizontal metallic diaphragm 11, with accessory supports. Component 11 has the advantage over 7 because it intercepts radiant energy and converts it to heat at a low level to increase the average temperature of the gas, for a given maximum operating temperature of the envelope ceiling, and because the more radiant is converted to heat at a low level, by 6a over all, the more heat is collected in the pockets, and a 7, 7a and 7aa which also enhances buoyancy, or its optional alternative as stated above.

In this specification the terms iron, steel, titanium and aluminum include alloyed as well as unalloyed metals.

Certain words used herein, or commonly used in connection with the present subject, while strictly speaking are misnomers, are nevertheless well established and their meanings understood, as, for example, "hot-air" balloon, and "radiant heat." Opaque", "translucent", "transparent", even when used in their scientific sense are difficult to define, broadly, and their dictionary definitions are inadequate for present purposes, which is concerned primarily with radiant energy that is emitted by a flame of burning hydrocarbon fuel and which is convertible to heat energy by contact with certain materials. If the amount of radiant energy converted to heat is substantial the material is herein understood to be opaque. If a material does not convert a substantial amount of radiant energy to heat it is herein understood to be translucent or transparent depending on the amount converted.

For the purposes of this specification it is not essential to understand the nature of radiant energy or even the theories concerning it. The terms "wave" and "ray" are helpful for the purpose of discusion. At one time a hypothetical substance termed "ether" was considered necessary as a medium for "waves" to occur in, but the term is now obsolete though "waves" is still used. The term "radiant heat" is a relic of an old notion that heat was radiated as well as conveyed and conducted. Radiation only appears to carry or convey heat, as such, but its transmission speed is practically instantaneous whereas heat energy is conveyed and conducted relatively slowly. It is recognized that emission of radiant energy is common to all substances,—it is a universal condition.

The invention is useful even if only partly utilized or not utilized to its full capability, for examples,—the invention may be used to advantage even if restricted to the use of single horizontal interceptor 7; or if, for extreme lightness and economy interceptor 7 may be composed of dark colored synthetic film that may not be completely opaque. Note: the opacity of an interceptor made of partly opaque material can be increased by using more than one layer.

I have described what I believe to be the best embodiments of my inventions. I do not wish, however, to be limited to the illustrative examples, but what I desire to be covered by letters patent is set forth in the appended claims.

I claim:

1. A hot air balloon capable of sustained flight and transport of one of more passengers comprised of an inflatable envelope having opaque portions, and one or more burners capable of producing products of combustion at a rate and amount required for the aforesaid flight and transport for a particular size of balloon and lift capacity, and where the flame or flames of combustion emit radiant energy which passes through the inside transparent air and gas and portions of the envelope without being converted to heat; said radiant energy being intercepted by opaque portions of the envelope and being converted to heat energy, the majority of said heat energy being lost to the outside atmosphere without having heated the gas within the envelope, wherein the improvement comprises: one or more thin shields substantially opaque to the radiant energy from the flame, individually interposed between the flame and the envelope, said shields being substantially surrounded by gas, said shields being attached at a multiplicity of points on the shields to points on the interior of the envelope or to a structure suspended within the envelope, whereby said shields intercept radiant energy from the flame before it reaches the envelope, convert it to heat energy and transfer it to the contiguous gas, to raise its temperature to make the balloon buoyant.

2. A hot air balloon as in claim 1 having one or more annular diaphragms made of synthetic material, each of said diaphragms being joined to the envelope by a substantially continuous and substantially horizontal seam between the peripheral edge and the envelope, and having three or more tension members attached to its inner edge at a lower level, said diaphragm or diaphrams constituting subceilings at successively lower levels beneath the balloon ceiling to collect one or more annular pockets of hot gas to raise the average temperature of the gas content of the envelope to augment buoyancy to increase the lift capacity of the balloon, said tension members having the function of maintaining an annular pocket configuration of the diaphragms.

3. A hot air balloon as in claim 1 wherein said one shield is a diaphragm made of opaque material suspended substantially horizontally and slackly beneath the balloon ceiling above the equator by tension members connecting a multiplicity of points on the periphery to points on the envelope, the distance between the edge of the diaphragm and the envelope being at least sufficient to permit the passage of gas; said diaphragm providing a subceiling to accumulate a pocket of hot gas to augment buoyancy or lift; and intercepting solar and sky radiation and radiant energy from the flame; said diaphragm converting the radiant energy from the flame and the sun and sky to heat energy and transferring it to the gas to augment buoyancy or lift.

4. A hot air balloon as in claim 1, wherein said one shield is a diaphragm made of a fabric or synthetic film substantially opaque to radiant energy, suspended horizontally within the envelope, the assembly having passageways for the movement of the gas through or around the diaphragm, to intercept radiant energy from the flame and solar radiation that enters the balloon through the envelope, convert it to heat and transfer it to the gas.

5. A hot air balloon as in claim 1, having a frame of metallic members mounted on and extending upward from a burner supporting structure to the height of the top of the flame, to surround, guard and support a sheet metal flue to surround the flame throughout its height, to intercept the radiant energy emitted by the flame, convert it to heat and transfer it to the gas.

6. A hot air balloon as in claim 1, having a frame work of metallic members mounted on and extending upward from a burner supporting structure to a height of several feet above the top of the flame to surround and support a sheet metal shield, about two to three feet in diameter, horizontally above and out of contact with the flame, to intercept radiant energy from the flame.

7. A hot air balloon as in claim 1, having a depending skirt and wherein said one shield is a circumferential curtain of opaque synthetic fabric suspended from the envelope by a series of radial tension members attached to the top of the curtain of which the diameter is at least equal to the diameter of the balloon at its junction with the skirt and of which the height extends upward from about the top of the flame to any desired height, to intercept radiant energy which slants upward from the flame, convert it to heat and transfer it to the gas, said curtain having a plurality of sets of radial horizontal spacer members connecting it to the envelope to prevent the curtain from sagging and contacting the flame during inflation, one set being attached circumferentially at the level of the bottom of the curtain and one or more sets being attached circumferentially at intermediate levels.

8. A hot air balloon as in claim 1, wherein said one shield is a circumferential curtain of opaque synthetic fabric suspended from the envelope at its junction with the skirt by a series of radial tension members attached to the top of the curtain of which the diameter is several inches less than the diameter of the skirt at the said junction to permit air to flow upward between and past the curtain and the skirt, the height of the curtain extending from the said junction downward to the bottom of the burner, to intercept radiant energy from the flame, convert it to heat and transfer it to the gas.

9. A hot air balloon as in claim 1 having a depending skirt and a circumferential conical curtain of opaque synthetic fabric suspended from the envelope by a plurality of tension members attached to its top edge, and also suspended by a plurality of tension members attached to the curtain and the envelope at the level of the top of the skirt, said curtain having a diameter at the level of the top of the skirt a few inches less than that of the envelope at that level; said curtain having a plurality of spacer members connecting points on the curtain to the envelope to maintain the curtain at a fixed distance from the envelope during inflation, to prevent accidental contact between the flame and the envelope, said conical curtain having any desired slope and length above and below the level of the top of the envelope skirt to intercept radiant energy from the flame, convert it to heat and transfer it to the gas.

10. A hot air balloon as in claim 1 having one or more annular diaphragms of synthetic fabric, suspended substantially horizontally at successively lower levels by continuous seams between their peripheries and the envelope and having tension members attached to their interior edges and extending down and attached to the balloon at a lower level or to a structure suspended from the balloon, said diaphragms providing annular pockets of hot gas.

11. A hot air balloon as in claim 1 wherein said envelope is composed of synthetic fabric of which a substantial portion above the equator is translucent to maximize the amount of solar radiation penetrating the envelope.

12. A hot air balloon as in claim 1, having a depending skirt and an assembly comprising a conical curtain of opaque synthetic fabric suspended from and within the envelope by a plurality of sets of tension members, one set being attached to its top edge, and another set, several inches long, attached at the level of the top of the skirt; said assembly having a plurality of horizontal spacer members whose individual lengths correspond approximately with distance between the curtain and the envelope at the point of attachment in flight, to prevent the curtain from sagging and contacting the flame during inflation; said curtain having any desired slope and length above and below the top of the skirt; said curtain having the function of preventing contact and near contact between the flame and the skirt and envelope during accidental or irregular behavior of the envelope during inflation.

13. A hot air balloon as in claim 1, wherein said one or more opaque shields being fabric or metallic and being interposed between the flame and the envelope and at a distance from the flame providing safety during normal inflation and flight operations by guarding against and preventing scorching of the envelope and/or skirt due to contact and near-contact between the flame and the envelope and/or skirt during accidental or irregular behavior of the envelope during inflation.

* * * * *

UNITED STATES PATENT AND TRADEMARK OFFICE
CERTIFICATE OF CORRECTION

PATENT NO. : 4,865,266

DATED : September 12, 1989

INVENTOR(S) : Harry S. George

It is certified that error appears in the above-identified patent and that said Letters Patent is hereby corrected as shown below:

On the title page, item [57]:
Abstract

Paragraph 1 9th line from bottom, change "hiterto" to read --hitherto--.
Paragraph 1, 6th line from bottom, change "being" to read --been--.
Column 2, line 36, insert "to" before radiant.

Column 9, line 49, change "overall" to read --and 11--.
Column 9, line 50 change "and a to read--under--.

Signed and Sealed this

Twenty-first Day of December, 1993

Attest:

BRUCE LEHMAN

Attesting Officer       Commissioner of Patents and Trademarks